United States Patent
Xie et al.

(10) Patent No.: US 11,371,898 B2
(45) Date of Patent: Jun. 28, 2022

(54) PRESSURE SENSOR INCLUDING INCREASED PROCESSING PRECISION

(71) Applicant: ILLINOIS TOOL WORKS, INC., Glenview, IL (US)

(72) Inventors: Longqiang Xie, Dongguan (CN); Yong Lai, Dongguan (CN)

(73) Assignee: ILLINOIS TOOL WORKS INC., Glenview, IL (US)

( * ) Notice: Subject to any disclaimer, the term of this patent is extended or adjusted under 35 U.S.C. 154(b) by 193 days.

(21) Appl. No.: 16/807,449

(22) Filed: Mar. 3, 2020

(65) Prior Publication Data
US 2020/0319046 A1    Oct. 8, 2020

(30) Foreign Application Priority Data

Mar. 4, 2019  (CN) .......................... 201910159416.0
Feb. 20, 2020  (CN) .......................... 202010104461.9

(51) Int. Cl.
| | | |
|---|---|---|
| G01L 7/08 | (2006.01) | |
| G01F 23/14 | (2006.01) | |
| G01L 9/00 | (2006.01) | |
| G01L 19/14 | (2006.01) | |
| G01L 19/00 | (2006.01) | |

(52) U.S. Cl.
CPC .............. *G01L 7/082* (2013.01); *G01F 23/14* (2013.01); *G01L 9/007* (2013.01); *G01L 19/0038* (2013.01); *G01L 19/147* (2013.01); *G01L 19/148* (2013.01)

(58) Field of Classification Search
None
See application file for complete search history.

(56) References Cited

U.S. PATENT DOCUMENTS 9,267,859 B2    2/2016  Weisser et al.

FOREIGN PATENT DOCUMENTS

| EP | 3 336 502 A1 | 6/2018 |
| KR | 10-2018-0079196 | 7/2018 |
| WO | WO 2015/153194 A1 | 10/2015 |

OTHER PUBLICATIONS

EPO, English language version of the International Search Report, Form PCT/ISA/210 for International Application PCT/US2020/020660, dated Jun. 12, 2020 (5 pages).
EPO, English language version of the Written Opinion of the ISA, Form PCT/ISA/237 for International Application PCT/US2020/020660, dated Jun. 12, 2020 (7 pages).

*Primary Examiner* — Lisa M Caputo
*Assistant Examiner* — Nigel H Plumb
(74) *Attorney, Agent, or Firm* — Pauley Erickson & Swanson

(57) ABSTRACT

A pressure sensor that includes a housing with an upper housing part and a lower housing part, the upper housing part and the lower housing part being configured such that a chamber is formed between them. A diaphragm is provided between the upper housing part and the lower housing part, and dividing the chamber into an upper chamber and a lower chamber. A magnetic core is linked to the diaphragm. An operating spring includes a top end and a bottom end, the top end being supported against the upper housing part and the bottom end being supported against the magnetic core. At least one of the top end and the bottom end of the operating spring is provided with an adhesive layer. The pressure sensor enables the operating spring and the magnetic core to move integrally with each other, thereby improving the precision of the pressure sensor.

20 Claims, 11 Drawing Sheets

PRESSURE SENSOR INCLUDING INCREASED PROCESSING PRECISION

CROSS-REFERENCE TO RELATED APPLICATIONS

Chinese Patent Application Nos. CN 201910159416.0, filed 4 Mar. 2019; CN 202010104461.9, filed 20 Feb. 2020 and PCT International Patent Application No. PCT/US2020/020660, filed 2 Mar. 2020, the priority documents corresponding to this invention, to which a foreign priority benefit is claimed under Title 35, United States Code, Section 119, and their entire teachings are incorporated, by reference, into this specification.

BACKGROUND OF THE INVENTION

Field of the Invention

The present invention relates to a sensor and, more particularly, to a pressure sensor used for detecting the operating parameters of domestic electrical appliances.

Discussion of Related Art

For some domestic electrical appliances such as washing machines, some operating parameters must be detected during their use to ensure their proper operations, e.g. the distribution uniformity of laundry to be done in the washing machine drum, the pressure of water supply and/or water level, etc.

Pressure sensors are used in prior art for the detection of water pressure and/or water level. A pressure sensor usually includes a rigid housing that has a deformable membrane sensitive to air pressure. When the pressure changes, deformation of the membrane takes place. A pressure sensor also includes a magnetic core, an operating spring and a coil, with the magnetic core moving reciprocatively in coordination with the membrane under the action of the operating spring in response to the membrane deformation. The coil is mounted to the housing such that the inductance of the coil is varied in response to movements of the magnetic core. The coil and capacitors form an oscillator circuit in response to the change in inductance of the coil, and the oscillator circuit is capable of producing oscillating electronic signals with variable frequency. Therefore, changes in water levels in the cylinders or drums of domestic electrical appliances (i.e. changes in pressures) during their use would lead to changes in oscillation frequency of the oscillating electronic signals.

SUMMARY OF THE INVENTION

Pressure sensors have relatively more stringent requirements for precision, and existing production process can hardly meet these precision requirements. It has been discovered by the applicant after long-term experiments and observations that for the same pressure sensor, the linearity of the oscillation frequency generated by the oscillator circuit in response to pressure change is poor during assembly and use, or the change in oscillation frequency is unstable; and for different pressure sensors, the linearity of the oscillation frequency generated by the oscillator circuit in response to pressure change is inconsistent.

It has been discovered by the applicant after long-term experiments and observations that the aforementioned problems are due to the unstable positional relativity between the magnetic core, the operating spring and the coil. Specifically, during reciprocation of the magnetic core in response to membrane deformation, the locus of the magnetic core does not completely correspond to pressure changes. In a prior art pressure sensor, the operating spring is usually metallic and there inevitably exist gaps of different widths between the ends of the operating spring and the plastic material, thus probably making the operating spring to sway or tilt and deviate with different magnitudes from its predetermined position. During reciprocation of the magnetic core in response to membrane deformation, mild internal vibration may be generated between the operating spring and the magnetic core which affects the locus of the magnetic core. Therefore, prior art pressure sensors can hardly meet the requirements for linearity of oscillation frequency and precision.

One of the objects of the present invention is to resolve the aforementioned problems by providing an improved pressure sensor.

In a first aspect, the present invention provides a pressure sensor that comprises: a housing comprising an upper housing part and a lower housing part, the upper housing part and the lower housing part being configured such that a chamber is formed between them; a diaphragm provided between the upper housing part and the lower housing part, and dividing the chamber into an upper chamber and a lower chamber; a magnetic core linked to the diaphragm; and an operating spring comprising a top end and a bottom end, the top end being supported against the upper housing part and the bottom end being supported against the magnetic core; wherein at least one of the top end and the bottom end of the operating spring is provided with an adhesive layer.

According to the first aspect, the diaphragm comprises a support and a thin film surrounding the support, the thin film being extended from the edge of the support; wherein the magnetic core is propped on the support.

According to the first aspect, a bearing plate is provided between the magnetic core and the support, the magnetic core being propped on the bearing plate.

According to the first aspect, the pressure sensor further comprises: compensating elastic components sandwiched between the lower housing part and the diaphragm.

According to the first aspect, the compensating elastic components include an elastic rod provided below the support of the diaphragm, the elastic rod being extended from the support and in contact with the bottom of the lower housing part, the elastic rod being capable of axial motion along the magnetic core.

According to the first aspect, the pressure sensor further comprises: an adjustment bolt provided at the top of the upper housing part, wherein the top end of the operating spring is supported against the adjustment bolt, the adjustment bolt is configured to adjust the magnitude of preset force applied by the operating spring on the magnetic core; and wherein the adhesive layers are configured to have the operating spring bonded to at least one of the magnetic core and the adjustment bolt.

According to the first aspect, the adhesive layers include a first adhesive layer provided between the top end of the operating spring and the adjustment bolt, the first adhesive layer being configured to have the top end of the operating spring bonded to the adjustment bolt.

According to the first aspect, the adhesive layers include a second adhesive layer provided between the bottom end of the operating spring and the magnetic core, the second adhesive layer being configured to have the bottom end of the operating spring bonded to the magnetic core.

According to the first aspect, the operating spring and the magnetic core are provided coaxially with each other.

According to the first aspect, the upper housing part is connected to the upper portion of the lower housing part, wherein a third adhesive layer is provided between the upper housing part and the lower housing part.

According to the first aspect, the pressure sensor further comprises: capacitors; and a coil mounted to the upper housing part, the coil working in coordination with the magnetic core to form a variable inductance sensor; wherein the capacitors and the variable inductance sensor form a variable frequency oscillator.

According to the first aspect, the pressure sensor further comprises: at least one printed circuit board whose rear portion is connected to the upper housing part, the end of the coil is connected to the at least one printed circuit board; the lower housing part is provided with support rods configured to support the front portion of the at least one printed circuit board; wherein a fourth adhesive layer is provided between the support rod and the at least one printed circuit board.

According to the first aspect, the coil comprises at least one coil layer; the upper housing part comprises a cylindrical end, each of the coil layers comprises a plurality of wire turns, each of the plurality of wire turns (655) is wound circumferentially around the cylindrical end; wherein a fifth adhesive layer extending axially along the cylindrical end is provided between at least two of the coil layers adjacent to each other, or between at least one of the coil layers and the cylindrical end.

According to the first aspect, the fifth adhesive layer is provided between the outermost of the coil layers and the coil layer on the inner side thereof, and configured to have the outermost of the coil layers bonded to the coil layer on the inner side thereof.

According to the first aspect, the operating spring comprises a plurality of helical coil turns, each of the top end and the bottom end of the operating spring comprises at least two closely appressed helical coil turns, the top end and/or the bottom end of the operating spring have closed ends.

According to the first aspect, the top end and/or the bottom end of the operating spring have closed and ground ends.

In a second aspect, the present invention provides a pressure sensor that comprises: a housing comprising an upper housing part and a lower housing part, the upper housing part and the lower housing part being configured such that a chamber is formed between them; a diaphragm provided between the upper housing part and the lower housing part, and dividing the chamber into an upper chamber and a lower chamber; a magnetic core linked to the diaphragm; and an operating spring comprising a top end and a bottom end, the top end being supported against the upper housing part and the bottom end being supported against the magnetic core; wherein at least one of the top end and the bottom end of the operating spring are bonded by means of adhesive bonding.

According to the second aspect, the diaphragm comprises a support and a thin film surrounding the support, the thin film being extended from the edge of the support; wherein the magnetic core is propped on the support.

According to the second aspect, the pressure sensor further comprises: compensating elastic components sandwiched between the lower housing part and the diaphragm.

According to the second aspect, the pressure sensor further comprises: an adjustment bolt provided at the top of the upper housing part, wherein the top end of the operating spring is supported against the adjustment bolt, the adjustment bolt is configured to adjust the magnitude of preset force applied by the operating spring on the magnetic core; and wherein at least one of the top end and the bottom end of the operating spring is bonded by means of adhesive bonding to at least one of the magnetic core and the adjustment bolt.

In comparison with prior art pressure sensors, the pressure sensor of the present invention enables the operating spring and the magnetic core to move integrally with each other, thereby improving the precision of the pressure sensor.

DETAILED DESCRIPTION

Figure 1:
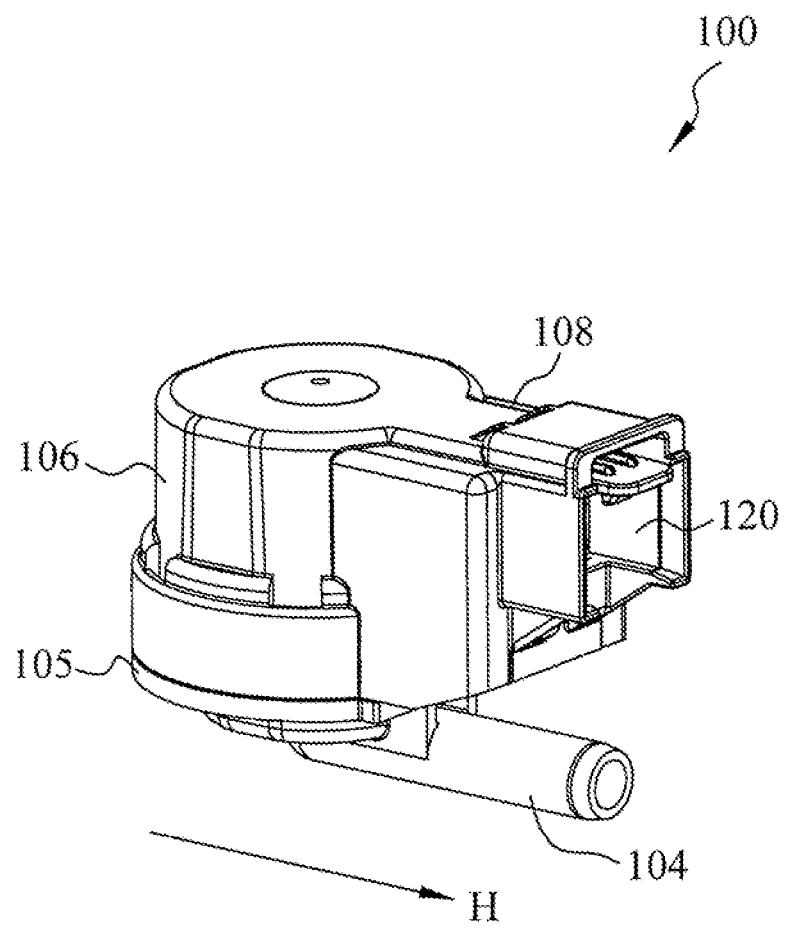
FIG. 1 is an isometric schematic of a pressure sensor of an embodiment of the present invention.

The present invention is described in further detail below with reference to preferred embodiments thereof in connection with the accompanying drawings. It should be understood that while terms used for indicating directions such as "in front of", "behind", "above", "below", "left", "right", "top" and "bottom" describe the structural components and elements of various embodiments of the present invention, their use is merely intended for illustrative purposes and determined based on orientation of the embodiments shown in the drawings. As the embodiments disclosed by the present invention can be in different directions, those terms used for indicating directions are meant to be illustrative rather than restrictive. Where possible, same or similar markers used in the present invention refer to the same or similar components.

FIG. 1 is an isometric schematic of a pressure sensor 100 of an embodiment of the present invention, which illustrates the structure of the pressure sensor. As shown in FIG. 1, the pressure sensor 100 comprises a housing 105 and a cover 106 disposed on the housing 105. The housing 105 at the bottom of the pressure sensor 100 is provided with a pipe joint 104 disposed thereon, the pipe joint 104 extends substantially in the longitudinal direction of the length H of the pressure sensor 100 and is configured to have the internal chamber of the housing 105 at least partially communicated with the fluid whose level is to be detected. The cover 106 is provided with an extended portion 108 on one side along the length H of the pressure sensor 100, and the end of the extended portion 108 is provided with a signal interface 120 configured to connect signals generated by the pressure sensor 100 to the control system of a washing machine.

Figure 2A:
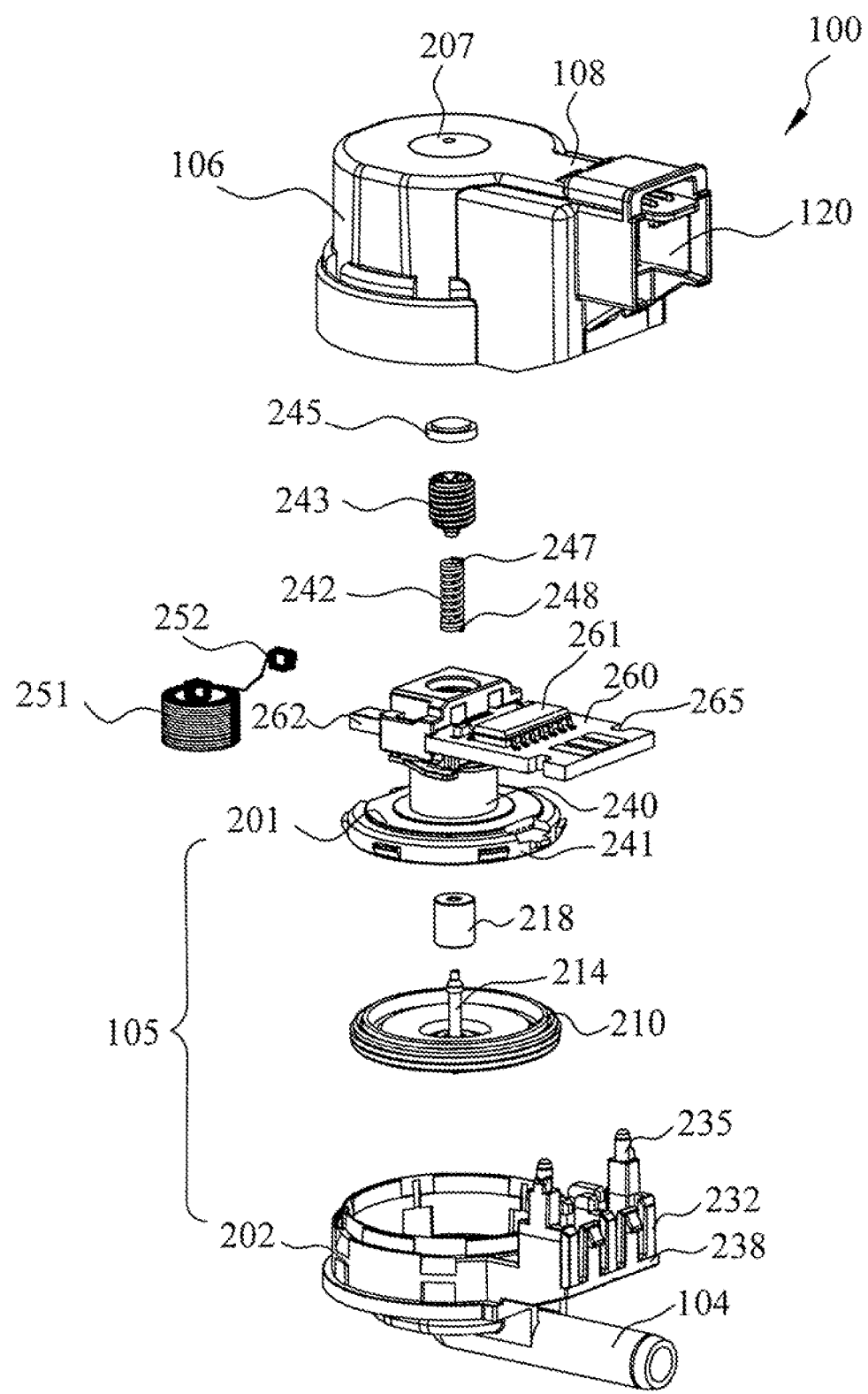
FIG. 2A is an exploded view of the pressure sensor shown in FIG. 1.
Figure 2B:
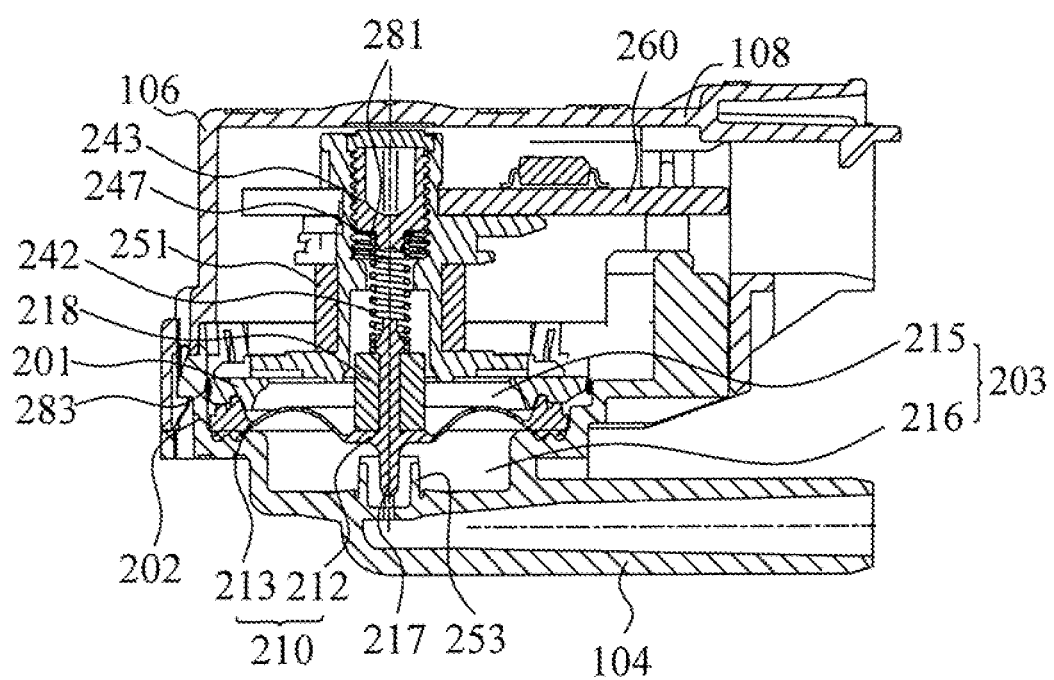
FIG. 2B is a longitudinal sectional view of the pressure sensor shown in FIG. 1.

FIG. 2A and FIG. 2B illustrate the structure of the pressure sensor 100, where FIG. 2A is an exploded view of the pressure sensor 100 shown in FIG. 1, and FIG. 2 is a longitudinal sectional view of the pressure sensor 100 shown in FIG. 1. As shown in FIG. 2A and FIG. 2B, the pressure sensor 100 comprises a housing 105 and a cover 106, the housing 105 comprising an upper housing part 201 and a lower housing part 202. The cover 106 is connected to the outer side of the sidewall of the lower housing part 202, the upper housing part 201 is connected to the inner side of the sidewall of the lower housing part 202, and a chamber 203 is formed between the upper housing part 201 and the lower housing part 202. The cover 106 comprises a main body 207 and an extended portion 108, wherein the main body 207 is approximately cylindrical. The lower housing part 202 is also approximately cylindrical and one side thereof is provided with a mounting platform 238. The cylindrical portion of the lower housing part 202 is partially connected to the main body 207 of the cover 106, e.g. by means of a snap-lock connection. The mounting platform 238 of the lower housing part 202 is provided with a snap-lock mechanism 232 by means of which the mounting platform 238 of the lower housing part 202 can be connected with the extended portion 108 of the cover 106.

The upper housing part 201 is cup-shaped and comprises a base 241 and a cylindrical end 240. The base 241 of the upper housing part 201 is connected to the inner side of the sidewall of the lower housing part 202. In an exemplary embodiment, the base 241 of the upper housing part 201 is connected to the inner side of the sidewall of the lower housing part 202 by means of adhesive bonding (e.g. glue dispensing) so that an adhesive layer 283 is formed between the base 241 of the upper housing part 201 and the lower housing part 202. The adhesive layer 283 enables the upper housing part 201 and the lower housing part 202 to be connected more firmly without relative motion in the vertical direction, thereby reducing the requirements for processing precision of the connection between the upper housing part 201 and the lower housing part 202.

As shown in FIG. 2A and FIG. 2B, the interior of the pressure sensor 100 comprises a pressure sensing portion, an inductance sensing portion and a signal output portion. The pressure sensing portion is configured to detect the pressure of the fluid to be measured, the inductance sensing portion is configured to convert the detected pressure to a certain amount of inductance, and signal output portion is configured to convert the inductance to an electronic signal to be outputted to the control system of a domestic electrical appliance.

The pressure sensing portion of the pressure sensor 100 comprises a diaphragm 210 provided in the chamber 203 between the upper housing part 201 and the lower housing part 202, the diaphragm 210 being capable of hermetically dividing the chamber 203 into an upper chamber 215 and a lower chamber 216. The diaphragm 210 undergoes deformation in response to pressure changes in the lower chamber 216. Deformation of the diaphragm 210 can reflect the magnitude of pressure of the liquid to be measured. Specifically, the diaphragm 210 comprises a support 212 and a thin film 213 surrounding the support 212, the thin film 213 being extended from the edge of the support 212. The edge of the thin film whose thickness is larger than that of the thin film is sandwiched between the upper housing part 201 and the lower housing part 202 so as to hermetically divide the upper chamber 215 and the lower chamber 216. The thin film 213 is arched upwards to facilitate deformation of the diaphragm 210. The upper chamber 215 is communicated with the atmosphere such that the pressure in the upper chamber 215 is equal to atmospheric pressure. In an exemplary embodiment, the upper housing part 201 may be provided with a plurality of through holes for the upper chamber 215 to be communicated with the atmosphere. The lower chamber 216 is connected to the cylinder of a domestic electrical appliance (for example) through the pipe joint 104 disposed at the bottom of the lower housing part 202 to facilitate the measurement of liquid level (or water level) in the cylinder. This being the case, the pressure in the lower chamber 216 is dependent on the pressure of the liquid to be measured, i.e. the liquid level (or water level) in the cylinder. Therefore, during the use of a domestic electrical appliance, as the liquid level (or water level) changes, pressure difference between the upper chamber 215 and the lower chamber 216 also changes. The diaphragm 210 undergoes deformation due to the changing pressure difference between the upper chamber 215 and the lower chamber 216. The pressure of the fluid to be measured can be obtained by detecting the magnitude of deformation of the diaphragm 210.

The inductance sensing portion of the pressure sensor 100 comprises a magnetic core 218 and a coil 251, wherein the magnetic core 218 is propped on the support 212 of the diaphragm 210, and the coil 251 is wound circumferentially around the cylindrical end 240. Along with the deformation of diaphragm 210, the magnetic core 218 moves and the amount of movement is the magnitude of deformation of the diaphragm 210. The magnetic core 218 is made of ferromagnetic material and can get in and out of the cylindrical end 240 of the upper housing part 201 so as to change the inductance of the coil 251 wound circumferentially around the cylindrical end 240, thereby forming a variable inductor. In an exemplary embodiment, the magnetic core 218 can be made of soft magnetic material.

Specifically, the magnetic core 218 can be in contact with or not in contact with the support 212 and linked to the support 212, e.g. propped by the support 212. In the embodiment shown in FIG. 2B, the magnetic core 218 is directly propped on the support 212. In other embodiments, the magnetic core 218 can be propped on a bearing plate 458 on the support 212 (see FIG. 4). In the embodiment shown in FIG. 2A and FIG. 2B, the diaphragm 210 further comprises a mounting rod 214 disposed at the top of the support 212, the mounting rod 214 extending vertically upwards from the top of the support 212. The magnetic core 218 is cylindrical and in which the mounting rod 214 is sheathed. In an exemplary embodiment, the shape and dimensions of the mounting rod 214 are set to match with the magnetic core 218, and the mounting rod 214 is coaxial with the magnetic core 218 so that the magnetic core 218 is stably propped by the support 212 without motion relative to each other.

The coil 251 is wound circumferentially around the cylindrical end 240 of the upper housing part 201 and disposed coaxially with the magnetic core 218 (i.e. the axis of the coil 251 and the axis of the magnetic core 218 coincide). When the magnetic core 218 moves relative to the housing 105 along with the deformation of the diaphragm 210, the magnetic core 218 can get in and out of the space defined by the coil 251 so as to change the inductance of the coil 251, thereby converting the detected pressure of the fluid to be measured to a certain amount of inductance.

The inductance sensing portion of the pressure sensor 100 further comprises an operating spring 242, an adjustment bolt 243 and compensating elastic components disposed opposite to the operating spring 242. In the embodiment shown in FIG. 2A and FIG. 2B, the compensating elastic components include an elastic rod 217 while in other embodiments the compensating elastic components may further include a compensating spring 318 (see FIG. 3). The operating spring 242 is sandwiched between the upper housing part 201 and the magnetic core 218, and the elastic rod 217 is sandwiched between the lower housing part 202 and the diaphragm 210. Specifically, the operating spring 242 comprises a top end 247 and a bottom end 248. In an embodiment of the present invention, the top end 247 of the operating spring 242 is connected abuttingly with the adjustment bolt 243 inserted from the top of the cylindrical end 240, while the bottom end 248 of the operating spring 242 is connected abuttingly with the magnetic core 218. When the operating spring 242 is compressed, the bottom end 248 thereof can apply a downward preset force on the magnetic core 218 to push the magnetic core 218. By adjusting the depth of insertion of the adjustment bolt 243 into the cylindrical end 240, the tightness of the operating spring 242 at its initial state can be adjusted and the magnitude of preset force applied by the operating spring 242 to the magnetic core 218 can thereby be adjusted. The compensating elastic components are configured such that their elastic forces or support forces can offset the gravitational forces generated by the magnetic core 218, the diaphragm 210 and other components and the preset force applied by the operating spring 242, in order that the magnetic core 218 can move linearly as pressure changes even when pressure change begins and signals with linearly changing frequency can be generated by the circuit. The top of the adjustment bolt 243 is provided with a bolt fixing adhesive 245 configured to fix the position of the adjustment bolt 243 to thereby fix the top end 247 of the operating spring 242.

According to an embodiment of the present invention, the compensating elastic component is the elastic rod 217 with flexibility or elasticity and the elastic rod 217 is extended downwards from the bottom of the support 212. The lower end of the elastic rod 217 can have contact with the bottom of the lower housing part 202. In this way, when the pressure sensor 100 is vertically placed during its use, the elastic rod 217 with flexibility or elasticity can generate compensating effects on the gravitational forces generated by the magnetic core 218, the diaphragm 210 and other components and on the preset force applied by the operating spring 242. The elastic rod 217 can be made integrally with the support 212. In addition, the elastic rod 217 is concentrically aligned with the mounting rod 214 so that the elastic rod 217 and the magnetic core 218 are coaxial with each other. The compensating elastic components can further include a compensating spring 318 which will be described in detail with reference to FIG. 3. The bottom of the lower housing part 202 is provided with a protruding component 253, and the protruding component 253 is a hollow tubular structure capable of partially accommodating the elastic rod 217 and configured to support the bottom of the elastic rod 217. The height of the protruding component 253 is set to be within the itinerary of upward and downward motions of the elastic rod 217, and the elastic rod 217 is always partially accommodated in the protruding component 253 such that it will not come off in order that the elastic rod 217 can move along its desired locus. The position of the elastic rod 217 can be restricted by providing the protruding component 253.

In the embodiment shown in FIG. 2B, the top end 247 of the operating spring 242 and the adjustment bolt 243 are connected by means of adhesive bonding (e.g. glue dispensing) so that an adhesive layer 281 is formed between the top end 247 of the operating spring 242 and the adjustment bolt 243. This arrangement ensures that the relative position of the operating spring 242 between the adjustment bolt 243 and the magnetic core 218 remains unchanged, so that the adjustment bolt 243 is coaxial with the magnetic core 218 and the adjustment bolt 243 and the operating spring 242 does not move non-axially. Hence, when the positions of the adjustment bolt 243 and the elastic rod 217 are fixed, the magnitude of preset force of the operating spring 242 on the magnetic core 218 also remains unchanged, and the operating spring 242 and the magnetic core 218 can move integrally with each other linearly along with change in pressure. Thus the rate of change of the inductance of the coil 251 with respect to pressure change remains table, and the rate of change of the oscillation frequency generated by the oscillator circuit with respect to pressure change also remains stable. Defining the position of the operating spring 242 by means of adhesive bonding can also enable consistency of the initial position of the magnetic core 218 during each assembly of the pressure sensor 100, and it enables the magnetic core 218 to return to that initial position after completion of each measurement. Therefore, the initial oscillation frequency generated by the oscillator circuit in response to pressure change remains the same. Even when the pressure sensor 100 is subjected to external forces (e.g. during transportation), the operating spring 242 in the pressure sensor 100 does not tilt, the positional relativity between the operating spring 242, the magnetic core 218 and the coil 251 can still remain fixed, and therefore the accuracy of measurement results by the pressure sensor 100 is not affected. Of course, in other embodiments the bottom end 248 of the operating spring 242 and the magnetic core 218 can be connected by means of adhesive bonding so that an adhesive layer 382 is formed between the bottom end 248 of the operating spring 242 and the magnetic core 218 (see FIG. 3).

Thus the elastic rod 217 and the operating spring 242 collectively support the magnetic core 218 at its initial position. At the initial position of the magnetic core 218, the pressures in the upper chamber 215 and the lower chamber 216 are approximately equal and the diaphragm 210 is not deformed. During the use of the domestic electrical appliance, the pressure in the lower chamber 216 gradually increases along with the rise in level of the fluid to be measured, thereby causing the upward compression to which the diaphragm 210 is subjected to gradually increase and resulting in deformation of the diaphragm 210, upward motion of the thin film 213 that causes the magnetic core 218 to move upwards into the space defined by the coil 251, and a certain amount of inductance is generated by the coil 251. The upward motion of the magnetic core 218 causes the operating spring 242 to be compressed. As the liquid level drops, pressure in the lower chamber 216 gradually decreases and the operating spring 242 rebounds and pushes the magnetic core 218 to move downwards.

The signal output portion of the pressure sensor 100 comprises a printed circuit board 260 disposed between the upper housing part 201 and the cover 106, the printed circuit board 260 is approximately rectangular and whose longitudinal direction is the same as that of the pressure sensor 100. The rear portion of the printed circuit board 260 in the longitudinal direction is connected to the top of the cylindrical end 240, and the front portion of the printed circuit board 260 in the longitudinal direction is provided with a pair of U-shaped indentations 265 configured for the installation of the support rods 235 erected on the mounting platform 238 of the lower housing part 202. Two connector pins 262 are extended from the rear portion of the printed circuit board 260 (see FIG. 5), and two ends 252 of the coil 251 are wound respectively on the connector pins 262 so that the coil 251 is connected to the circuit of the printed circuit board 260. The printed circuit board 260 is also provided with capacitors 568 and 569 (see FIG. 5A). The capacitors 568, 569 and the coil 251 form an oscillator circuit (i.e. variable frequency oscillator). When the inductance of the coil 251 is affected by the upward and downward motion of the magnetic core 218, the oscillator circuit can generate signals with linearly changing frequency based on the changing inductance of the coil 251.

Thus, during the use of a domestic electrical appliance (such as a washing machine), as the level of fluid (or water level) to be measured changes (i.e. pressure of the fluid changes), the diaphragm 210 undergoes deformation and the magnetic core 218 can move upwards and downwards and get in and out of the cylindrical end 240 of the upper housing part 201. Based on the magnitude of insertion of the magnetic core 218 into the space defined by the coil 251 wound circumferentially around the cylindrical end 240, the coil 251 generates a certain amount of inductance. The oscillator circuit then generates signals with linearly changing frequency based on the changing inductance of the coil 251 and transmit the signals to the control system of the domestic electrical appliance (e.g. washing machine).

Figure 3:
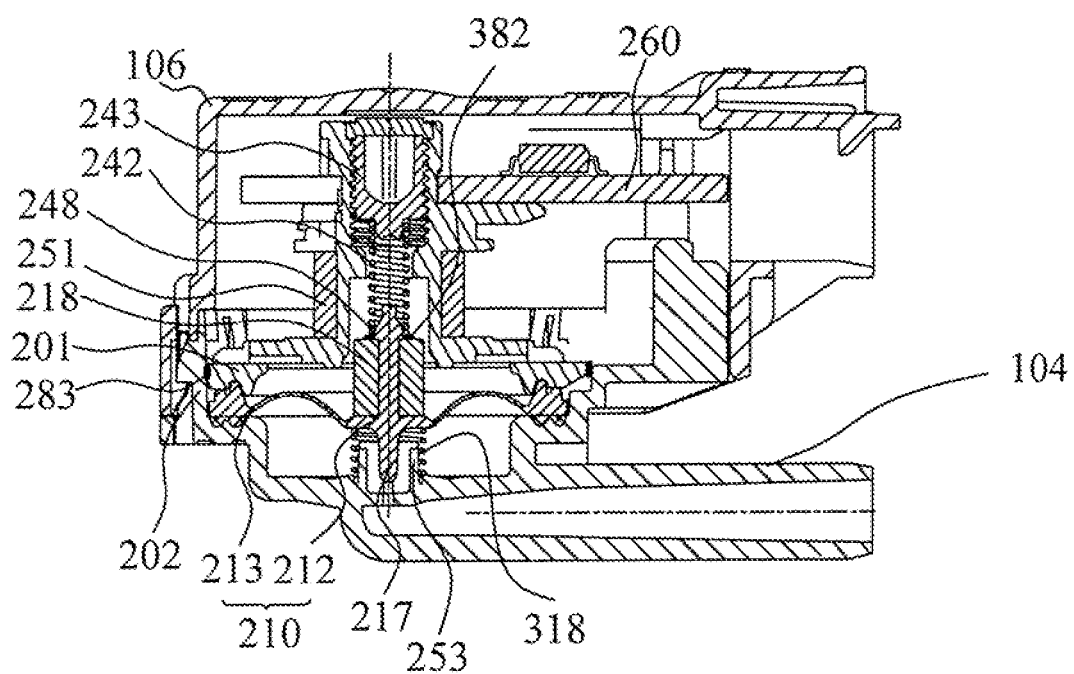
FIG. 3 is a longitudinal sectional view of a pressure sensor of another embodiment of the present invention.

FIG. 3 is a longitudinal sectional view of a pressure sensor of another embodiment of the present invention. This embodiment is about the same as the embodiment shown in FIG. 2B, and the only difference is that the compensating elastic components in the pressure sensor shown in FIG. 3 further include a compensating spring 318. As shown in FIG. 3, the compensating elastic components are a combination of the elastic rod 217 and the compensating spring 318. The compensating spring 318 is sandwiched between the support 212 and the bottom of the lower housing part 202, and the protruding component 253 is sheathed in the compensating spring 318. By adjusting the depth of insertion of the adjustment bolt 243 into the cylindrical end 240, the tightness of the operating spring 242 and the compensating spring 318 at their initial states can be adjusted and the magnitudes of preset forces applied respectively by the operating spring 242 and the compensating spring 318 to the magnetic core 218 from both sides can thereby be adjusted. Addition of the compensating spring 318 can better compensate the gravitational forces of the magnetic core 218, the diaphragm 210 and other components, so that frequency signal output varies linearly when the pressure in the lower chamber 216 begins to change. Also, the adjustability of the compensating elastic components is increased.

As shown in FIG. 3, the bottom end 248 of the operating spring 242 is connected to the magnetic core 218 by means of adhesive bonding (e.g. glue dispensing), so that an adhesive layer 382 is formed between the bottom end 248 of the operating spring 242 and the magnetic core 218. The adhesive layer 382 can also ensure that the relative position of the operating spring 242 between the adjustment bolt 243 and the magnetic core 218 remains unchanged so that the operating spring 242 does not move non-axially, thereby achieving the same effects as the adhesive layer 281. As an embodiment, providing one of the adhesive layer 281 and the adhesive layer 382 will do to increase flexibility in the assembly of internal components of the pressure sensor.

Figure 4:
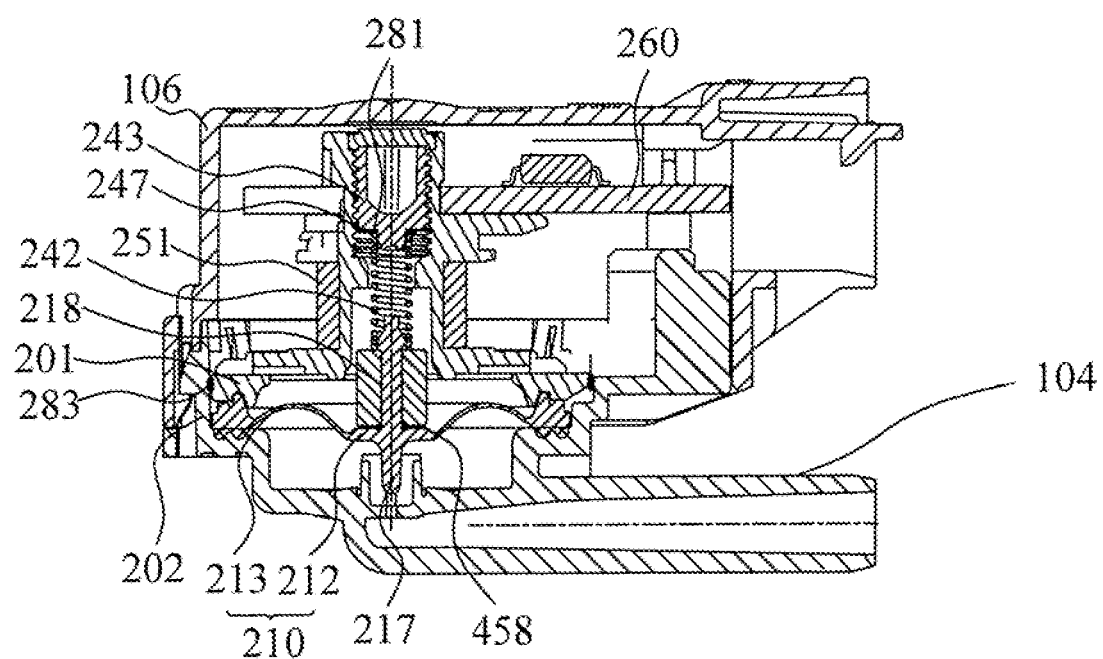
FIG. 4 is a longitudinal sectional view of a pressure sensor of yet another embodiment of the present invention.

FIG. 4 is a longitudinal sectional view of a pressure sensor of yet another embodiment of the present invention. This embodiment is about the same as the embodiment shown in FIG. 2B, and the difference is that a bearing plate 458 is provided between the magnetic core 218 and the support 212. The magnetic core 218 is propped on the bearing plate 458 so that the magnetic core 218 is indirectly propped on the support 212, and the magnetic core 218 and the bearing plate 458 move upwards and downwards together along with deformation of the diaphragm 210.

Figure 5A:
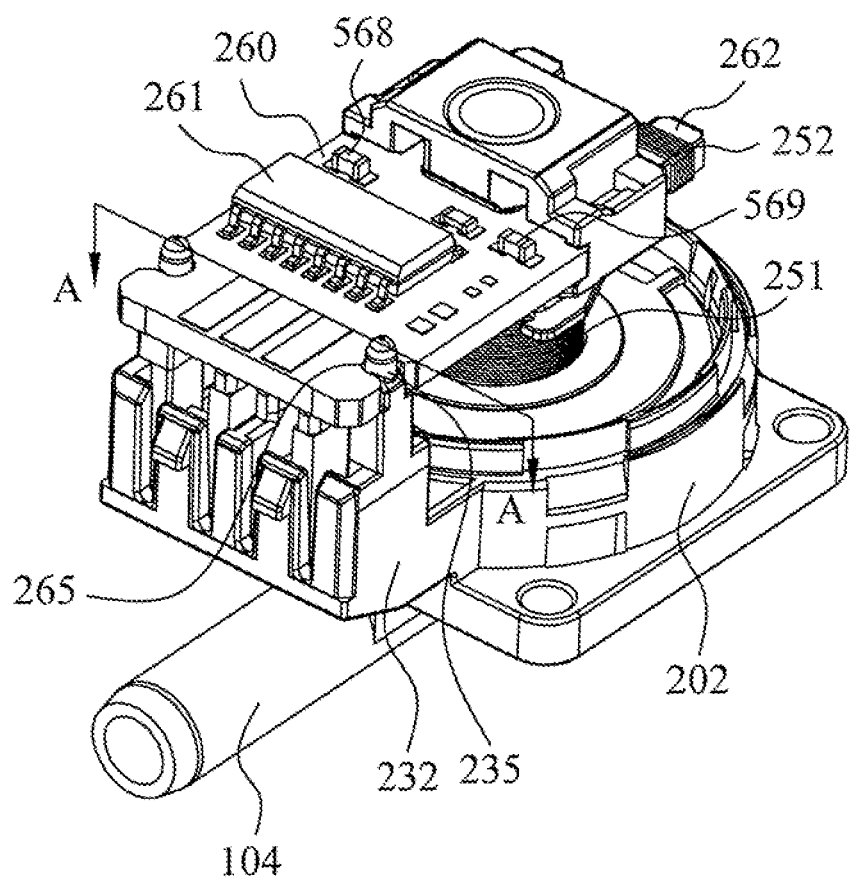
FIG. 5A is an isometric schematic illustrating the pressure sensor shown in FIG. 1 with its cover removed.
Figure 5B:
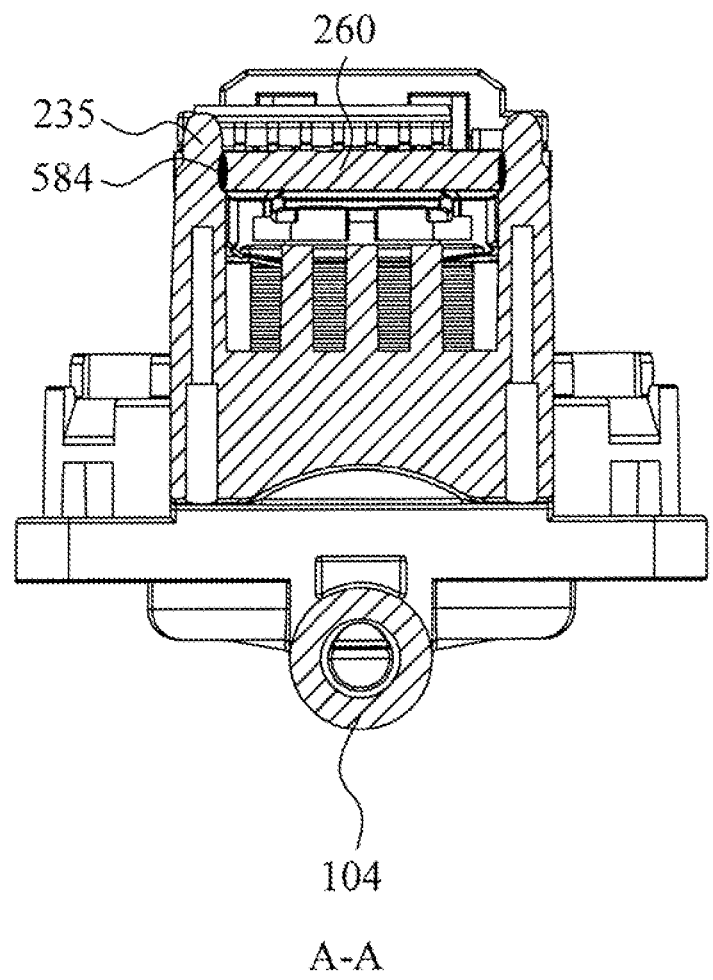
FIG. 5B is a sectional view taken along the line A-A shown in FIG. 5A.

FIG. 5A is an isometric schematic illustrating the pressure sensor shown in FIG. 1 with its cover removed. FIG. 5B is a sectional view taken along the line A-A shown in FIG. 5A and illustrates the structure of the printed circuit board 260 of the pressure sensor 100.

As shown in FIG. 5A and FIG. 5B, the printed circuit board 260 is mounted at the top of the upper housing part 201, with two ends 252 of the coil 251 wound around two connector pins 262 so that the coil 251 is connected with the printed circuit board 260. The printed circuit board 260 is provided with a chip 261, e.g. a sensor chip. The printed circuit board 260 is provided with two capacitors 568 and 569, and the two capacitors 568, 569 and the coil 251 together form an oscillator circuit. It is worth noting that other than the chip 261 and the capacitors 568, 569 shown, the printed circuit board 260 may be installed with other chips, capacitors or other electronic components. In addition, the support rods 235 near the snap-lock mechanism 232 on the lower housing part 202 is configured to help support the front portion of the printed circuit board 260. The front portion of the printed circuit board 260 is configured for connection with the signal interface 120 to transmit output signals from the oscillator circuit on the printed circuit board 260 through the interface 120.

The bottom of the U-shaped indentations 265 on the printed circuit board 260 and the support rods 235 can be connected by means of adhesive bonding (e.g. glue dispensing), so that an adhesive layer 584 is formed between the bottom of the U-shaped indentations 265 and each of the support rods 235. This arrangement enables the printed circuit board 260 to be connected more firmly so that the printed circuit board 260 does not sway on the upper housing part 201 even when the pressure sensor 100 is subjected to external forces (e.g. during transportation).

Figure 6A:
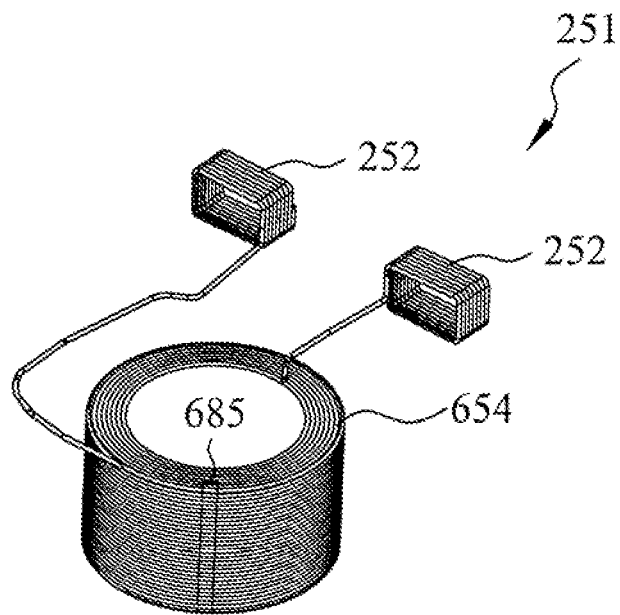
FIG. 6A and FIG. 6B illustrate the structure of a coil.
Figure 6B:
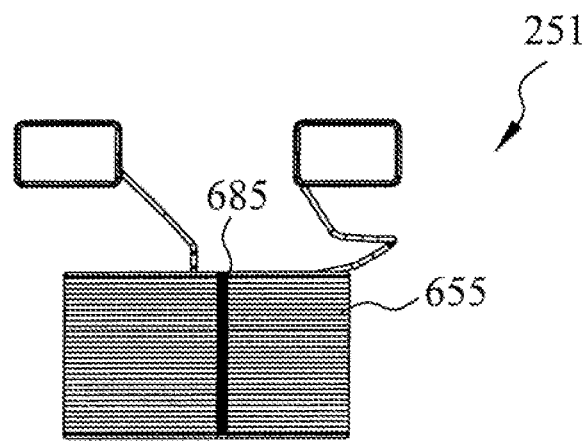

FIG. 6A and FIG. 6B illustrate the structure of a coil 251, wherein FIG. 6A is an isometric schematic of the coil 251 while FIG. 6B is a front view of the coil 251. As shown in FIG. 6A and FIG. 6B, the coil 251 can also include one or a plurality of coil layers 654 arranged radially around the cylindrical end 240 depending on application requirements. Each of the coil layers 654 comprises a plurality of wire turns 655 parallelly arranged longitudinally along the cylindrical end 240, each of the plurality of wire turns 655 is wound circumferentially around the cylindrical end 240. At least two of the coil layers 654 adjacent to each other are bonded together by means of adhesive bonding (e.g. glue dispensing), so that an adhesive layer 685 is formed between the at least two of the coil layers 654 adjacent to each other to prevent the coil 251 from coming off. Or, the innermost of the coil layers 654 and cylindrical end 240 are bonded together by means of adhesive bonding, so that an adhesive layer 685 is formed between the innermost of the coil layers 654 and cylindrical end 240. In an exemplary embodiment, when the number of coil layers of the coil 251 is small, the arrangements can be such that an adhesive layer is formed between the outermost of the coil layers and its adjacent coil layer, and in which case it should be understood that adhesive can also be made to seep inwards from the outside to other adjacent coil layers to form adhesive layers 685. In an exemplary embodiment, the adhesive layer 685 is an elongated strip extending longitudinally from the top to the bottom of the cylindrical end. On the one hand, this arrangement of the adhesive layer 685 only requires a small amount of adhesive to have the coil layers 654 bonded together. On the other hand, the adhesive layer 685 will not affect sensing of the position of the magnetic core 218 by the coil 251 and will also not affect the inductance generated by the coil 251. Thus the structure of the coil 251 is stronger, and when the magnetic core 218 moves upwards and downwards the coil 251 can stably generate corresponding inductance.

Figure 7A:
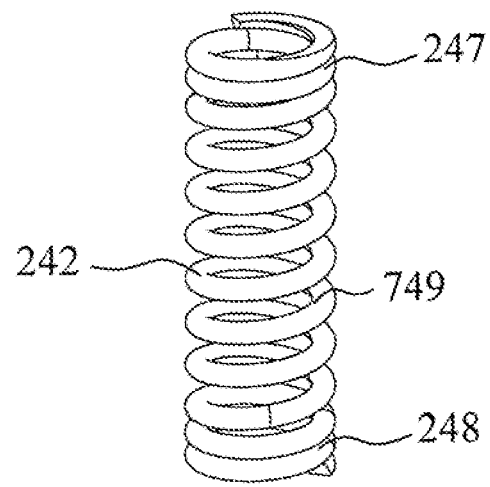
FIG. 7A and FIG. 7B illustrate the structure of an operating spring.
Figure 7B:
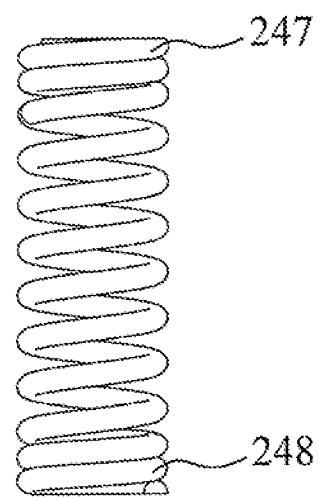

FIG. 7A and FIG. 7B illustrate the structure of an operating spring 242, where FIG. 7A is an isometric schematic of the operating spring 242 while FIG. 7B is a front view of the operating spring 242. As shown in FIG. 7A and FIG. 7B, the operating spring 242 is a cylindrical hermetical spring comprising a plurality of spring coils 749 with most adjacent spring coils 749 spaced at intervals to enable compression of the operating spring 242. No interval is left between the spring coils 749 at the ends of the operating spring 242. In an exemplary embodiment, the top end 247 of the operating spring 242 includes two parallelly appressed spring coils 749, and the bottom end 248 of the operating spring 242 also includes two parallelly appressed spring coils 749. The spring coils 749 at the top end 247 and the bottom end 248 of the operating spring 242 enable the operating spring 242 to be vertically erected, sandwiched between the adjustment bolt 243 and the magnetic core 218, flush with the lower surface of the adjustment bolt 243 and the upper surface of the magnetic core 218, and disposed coaxially with the operating spring 242, the magnetic core 218 and the coil 251. At this time, both ends of the operating spring 242 are not involved in deformation. In an exemplary embodiment, the top end 247 and the bottom end 248 of the operating spring 242 have closed ends, and the ends can be ground or not ground. It can be understood that a ground and closed end structure is capable of ensuring the operating spring 242 and the magnetic core 218 to be disposed coaxially with each other, but the cost is relatively higher. In some embodiments, the ends of the operating spring 242 are not ground so as to save cost. In the embodiments of the present invention, the ends of the operating spring are fixed by means of adhesive bonding without having to grind the ends of the operating spring, and the results achieved are good.

Figure 8A:
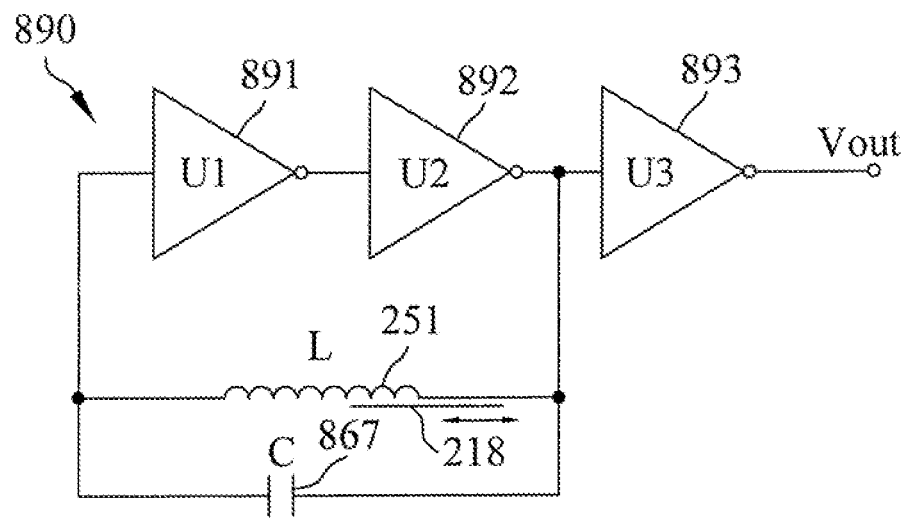
FIG. 8A and FIG. 8B are schematic circuit diagrams depicting the oscillator circuits of two embodiments of the present invention.
Figure 8B:
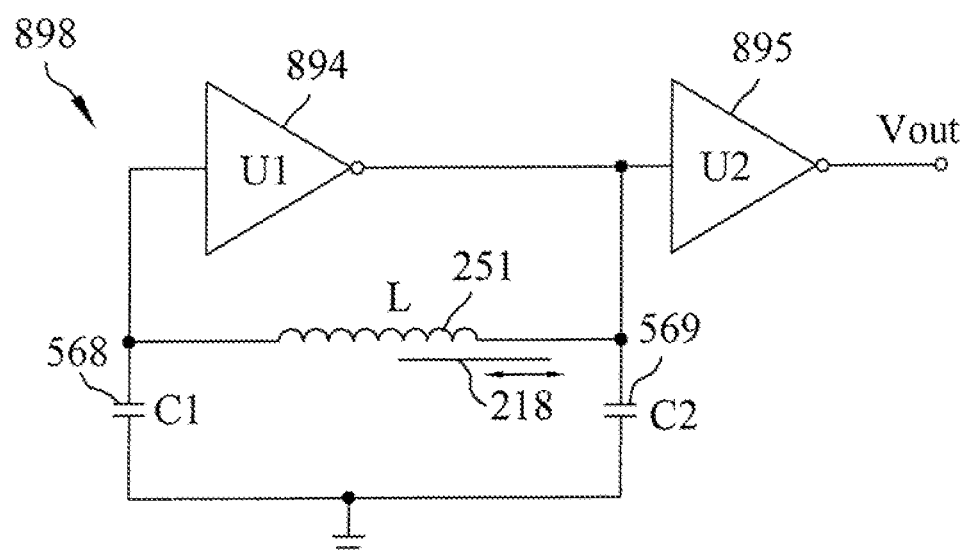

FIG. 8A and FIG. 8B are schematic circuit diagrams depicting oscillator circuits on the printed circuit board 260, and they illustrate the principles of electric circuits whereby linearly changing frequency of oscillation is generated along with motion of the magnetic core 218. In the two embodiments shown in FIG. 8A and FIG. 8B, the oscillator circuits are provided with different numbers of capacitors to meet different requirements. The coil 251 in the pressure sensor 100 is equivalent to an inductor L 251 shown in the figures. Difference in pressure results in change of position of the magnetic core 218 and thereby changes the inductance of the inductor L 251. The oscillator circuit 890 shown in FIG. 8A comprises only one capacitor 867 connected in parallel with the coil 251, while the oscillator circuit 898 shown in FIG. 8B comprises two capacitors 568 and 569 connected in series before being connected in parallel with the coil 251. The capacitors are resonant frequency selective capacitors for example.

As shown in FIG. 8A, an inductor L 251 and a capacitor C 867 form a parallelly connected frequency selective network, and integrated circuits U1 891 and U2 892 as positive feedback amplifiers are connected in parallel with the parallelly connected frequency selective network formed by the inductor L 251 and the capacitor C 867. An integrated circuit U3 893 is configured for waveform shaping to output square wave signals, and the output linearly changing frequency of the circuit is:

$$F = \frac{1}{2\pi\sqrt{LC}},$$

where L represents inductance of the coil 251.

As shown in FIG. 8B, an inductor L 251 and capacitors C1 568 and C2 569 form a standard capacitive three point oscillator circuit, and an integrated circuit U1 894 as an inverting amplifier is connected in parallel with the capacitive three point oscillator circuit. An integrated circuit U2 895 is configured for waveform shaping to output square wave signals, and the output linearly changing frequency of the circuit is:

$$F = \frac{1}{2\pi\sqrt{L\dfrac{C1C2}{C1+C2}}}$$

where L represents inductance of the coil 251.

Therefore, when the operating spring 242 is fixed by means of adhesive bonding, the magnetic core 218 can move upwards and downwards in response to pressure change and result in change in inductance of the coil 251 to obtain a linearly changing frequency. As an exemplary embodiment, a number of integrated circuits U1, U2, U3 may be disposed on a domestic electrical appliance using the pressure sensor of the present invention to form the circuits shown in FIG. 8A and FIG. 8B, but a number of integrated circuits U1, U2, U3 may also be disposed on the pressure sensor to form he circuits shown in FIG. 8A and FIG. 8B for direct output of result signals, and all the capacitors and other electronic components may also be disposed in a domestic electrical appliance using the pressure sensor of the present invention.

Figure 9:
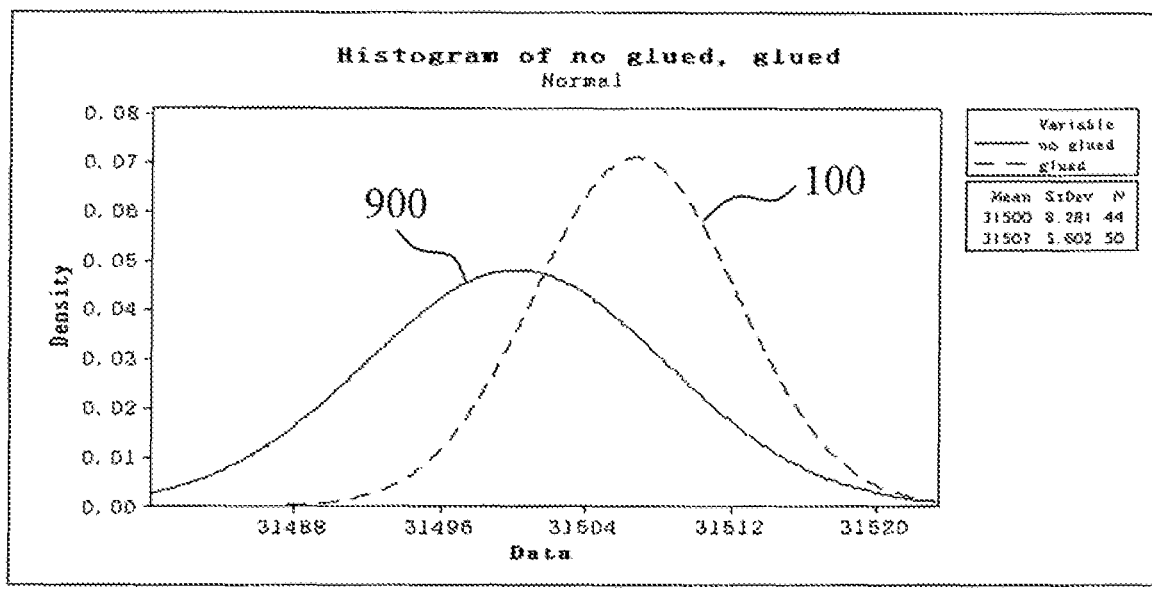
FIG. 9 is a graph illustrating the statistical results in terms of capabilities of a prior art pressure sensor and a pressure sensor of the present invention during production processes.

FIG. 9 is a graph illustrating the statistical results in terms of capabilities of a prior art pressure sensor 900 and a pressure sensor 100 of the present invention during production processes. In the embodiment, the prior art pressure sensor 900 is not provided with adhesive layers 281 and 382, the operating spring 242 is directly sandwiched between the adjustment bolt 243 and the magnetic core 218. Alternatively, the prior art pressure sensor 900 is also not provided with adhesive layers 283, 584 and 685.

The pipe joints of the prior art pressure sensors 900 and the pipe joints 104 of various pressure sensors 100 of the present invention were connected respectively to a predetermined fluid for the fluid to be supplied to the pressure sensors at preset pressures. When the same pressure was supplied to the pressure sensors, the output frequencies (i.e. oscillation frequencies) of the circuits of the pressure sensors 900 and the pressure sensors 100 were measured, and a normal distribution graph as shown in FIG. 9 was obtained. As shown in FIG. 9, the pressure distribution measured by the pressure sensor 900 is shorter and broader which indicates that the individual differences between the pressure sensors 900 are relatively greater, while the pressure distribution measured by the pressure sensor 100 is taller and narrower which indicates that the individual differences between the pressure sensors are relatively smaller.

When fluid of different pressures is supplied to the pressure sensor 100 of the present invention, the output frequency (i.e. oscillation frequency) of the circuit and the pressure are linearly related which indicates that the output frequency of the pressure sensor 100 is stable and the measurement results are reliable.

In the pressure sensor 100 of the present invention, the operating spring 242 and the adjustment bolt 243 or the magnetic core 218 are fixed by means of adhesive bonding. This results in the relative position of the operating spring 242 between the adjustment bolt 243 and the magnetic core 218 being fixed and the operating spring 242 does not move non-axially, thereby making the magnitude of preset force applied by the operating spring 242 to the magnetic core 218 remain unchanged, the operating spring 242 and the magnetic core 218 linearly moving integrally with each other along with pressure change to obtain linearly changing frequency. Therefore, even when the pressure sensor 100 is subjected to external forces (e.g. during transportation), the operating spring 242 in the pressure sensor 100 does not tilt, the positional relativity between the operating spring 242, the magnetic core 218 and the coil 251 can still remain fixed, and therefore the accuracy of measurement results by the pressure sensor 100 is not affected. By improving the precision of the inductance sensing portion of the pressure sensor 100, the pressure and inductance can correspond more accurately. After the conversion of inductance to oscillation frequency, the pressure and oscillation frequency become linearly related.

The adhesive layers in the present invention is formed by dispensing glue or applying glue at the relevant locations for it to be toughened. The adhesive layers are formed by means of gluing or adhesive bonding. The adhesive used in the present invention has a certain degree of high-temperature resistance, weatherability and water resistivity. As an exemplary embodiment, the adhesive is an adhesive of the silicone rubber system or the epoxy system.

While the present invention is described with reference to the embodiments shown in the accompanying drawings, it should be understood that the pressure sensor of the present invention can have many variations without departing from the spirit and scope of the present invention. Whenever possible, the components and/or structures in the embodiments of the present invention can be combined in various ways and such combinations shall fall within the scope of protection of the present invention. Persons of ordinary skill in the art would contemplate to modify in different ways the parameters of the embodiments disclosed by the present invention, and such modifications shall fall within the scope of protection defined by the claims of the present invention.

What is claimed is:

1. A pressure sensor comprising:
a housing including an upper housing part comprising a base and a cylindrical end, and a lower housing part, the upper housing part and the lower housing part configured with a chamber formed there between;
a diaphragm provided between the upper housing part and the lower housing part, and dividing the chamber into an upper chamber and a lower chamber;
a magnetic core linked to the diaphragm; and
an operating coil spring including a top end and a bottom end, the top end supported against the cylindrical end of the upper housing part and the bottom end supported against the magnetic core;
wherein at least one of the top end or the bottom end of the operating coil spring includes an adhesive layer.

2. The pressure sensor as defined in claim 1, wherein:
the diaphragm comprises a support and a thin film surrounding the support, the thin film extending from the edge of the support;
wherein the magnetic core is propped on the support.

3. The pressure sensor as defined in claim 2, further comprising:
a bearing plate between the magnetic core and the support, the magnetic core propped on the bearing plate.

4. The pressure sensor as defined in claim 1, further comprising:
compensating elastic components sandwiched between the lower housing part and the diaphragm.

5. The pressure sensor as defined in claim 4, wherein:
the compensating elastic components include an elastic rod provided below the support of the diaphragm, the elastic rod being extended from the support and in contact with the bottom of the lower housing part, the elastic rod configured for axial motion along the magnetic core.

6. The pressure sensor as defined in claim 1, further comprising:
an adjustment bolt provided at the top of the upper housing part, wherein the top end of the operating spring is supported against the adjustment bolt, the adjustment bolt configured to adjust the magnitude of preset force applied by the operating spring on the magnetic core; and
wherein the adhesive layers are configured to bond the operating spring to at least one of the magnetic core and the adjustment bolt.

7. The pressure sensor as defined in claim 6, wherein:
the adhesive layers include a first adhesive layer provided between the top end of the operating spring and the adjustment bolt, the first adhesive layer configured bond the top end of the operating spring to the adjustment bolt.

8. The pressure sensor as defined in claim 7, wherein:
the adhesive layers include a second adhesive layer between the bottom end of the operating spring and the magnetic core, the second adhesive layer configured to bond the bottom end of the operating spring to the magnetic core.

9. The pressure sensor as defined in claim 6, wherein:
the operating spring and the magnetic core are disposed coaxially to each other.

10. The pressure sensor as defined in claim 9, wherein:
the upper housing part is connected to the upper portion of the lower housing part, wherein a third adhesive layer is provided between the upper housing part and the lower housing part.

11. The pressure sensor as defined in claim 9, further comprising:
capacitors; and
a coil mounted to the upper housing part, the coil working in coordination with the magnetic core to form a variable inductance sensor;
wherein the capacitors and the variable inductance sensor form a variable frequency oscillator.

12. The pressure sensor as defined in claim 11, further comprising:
at least one printed circuit board including a rear portion connected to the upper housing part, the end of the coil connected to the at least one printed circuit board;
the lower housing part including support rods configured to support the front portion of the at least one printed circuit board; and a fourth adhesive layer disposed between the support rod and the at least one printed circuit board.

13. The pressure sensor as defined in claim 11, wherein:
the coil comprises a plurality of coil layers;
each coil layer of the plurality of coil layers comprising a plurality of wire turns, each of the plurality of wire turns wound circumferentially around the cylindrical end; and
a fifth adhesive layer extends axially along the cylindrical end between at least two of the coil layers adjacent each other, or between at least one of the coil layers and the cylindrical end.

14. The pressure sensor as defined in claim 13, wherein:
the fifth adhesive layer is provided between the outermost of the coil layers and the coil layer on the inner side thereof, and configured to bond the outermost of the coil layers to the coil layer on the inner side thereof.

15. The pressure sensor as defined in claim 1, wherein:
the operating spring comprises a plurality of helical coil turns, each of the top end and the bottom end of the operating spring comprises at least two closely appressed helical coil turns, the top end and/or the bottom end of the operating spring have closed ends.

16. The pressure sensor as defined in claim 15, wherein:
the top end and/or the bottom end of the operating spring have closed and ground ends.

17. A pressure sensor comprising:
a housing including an upper housing part comprising a base and a cylindrical end, and a lower housing part, the upper housing part and the lower housing part configured with a chamber there between;
a diaphragm between the upper housing part and the lower housing part, and dividing the chamber into an upper chamber and a lower chamber;
a magnetic core linked to the diaphragm;
an operating spring including a top end and a bottom end, the top end supported against the cylindrical end of the upper housing part and the bottom end supported against the magnetic core;
wherein at least one of the top end and the bottom end of the operating spring is bonded by an adhesive;
a coil mounted to the upper housing part, the coil working in coordination with the magnetic core to form a variable inductance sensor, wherein the coil comprises a plurality of coil layers; and
an adhesive layer extends axially along the cylindrical end between at least two adjacent coil layers of the plurality of coil layers, or between at least one coil layer of the plurality of coil layers and the cylindrical end.

18. The pressure sensor as defined in claim 17, wherein:
the diaphragm comprises a support and a thin film surrounding the support, the thin film extending from the edge of the support;
wherein the magnetic core is propped on the support.

19. The pressure sensor as defined in claim 18, further comprising:
compensating elastic components sandwiched between the lower housing part and the diaphragm.

20. The pressure sensor as defined in claim 17, further comprising:
an adjustment bolt at the top of the upper housing part, wherein the top end of the operating spring is supported against the adjustment bolt, the adjustment bolt is configured to adjust the magnitude of preset force applied by the operating spring on the magnetic core; and
wherein at least one of the top end and the bottom end of the operating spring is bonded by an adhesive to at least one of the magnetic core or the adjustment bolt.

* * * * *